Jan. 18, 1955   H. GEHRE   2,699,678
GAS FLOW MEASURING EQUIPMENT
Filed Feb. 24, 1951   4 Sheets-Sheet 1
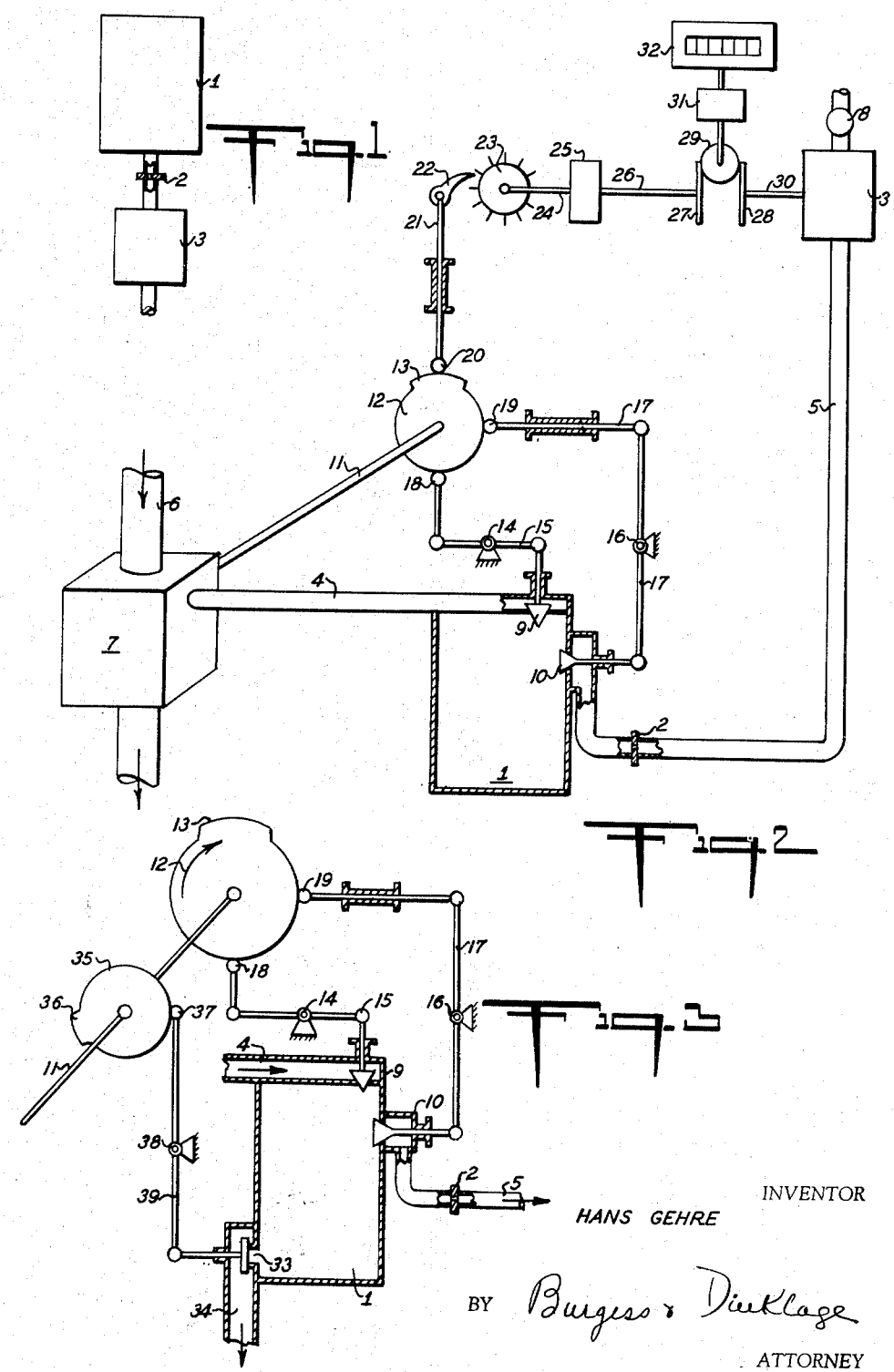
INVENTOR
HANS GEHRE
BY Burgess & Dinklage
ATTORNEY Jan. 18, 1955     H. GEHRE     2,699,678
GAS FLOW MEASURING EQUIPMENT
Filed Feb. 24, 1951     4 Sheets-Sheet 2
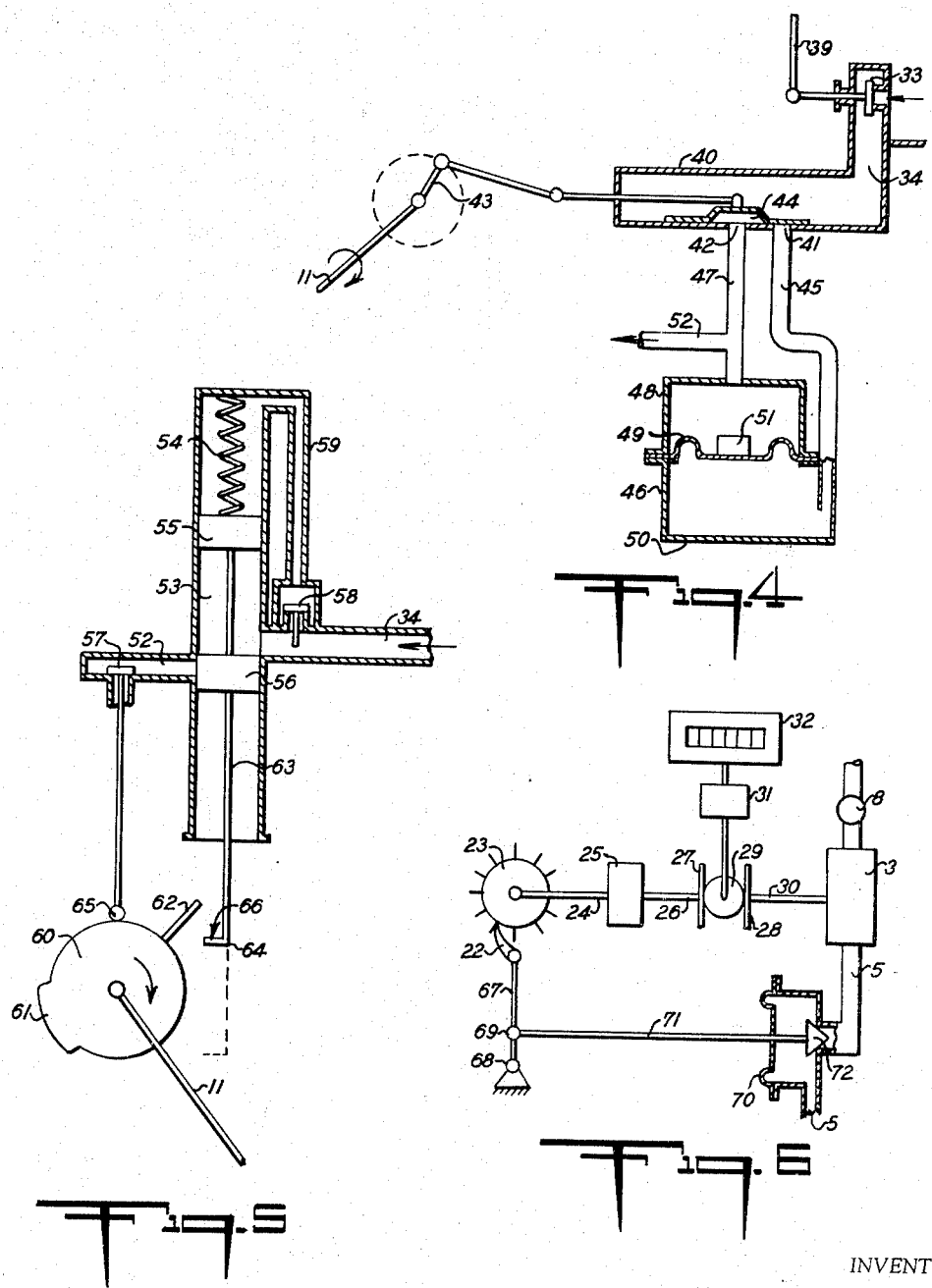
INVENTOR
HANS GEHRE
BY [signature]
ATTORNEY Jan. 18, 1955        H. GEHRE        2,699,678
GAS FLOW MEASURING EQUIPMENT
Filed Feb. 24, 1951        4 Sheets-Sheet 3
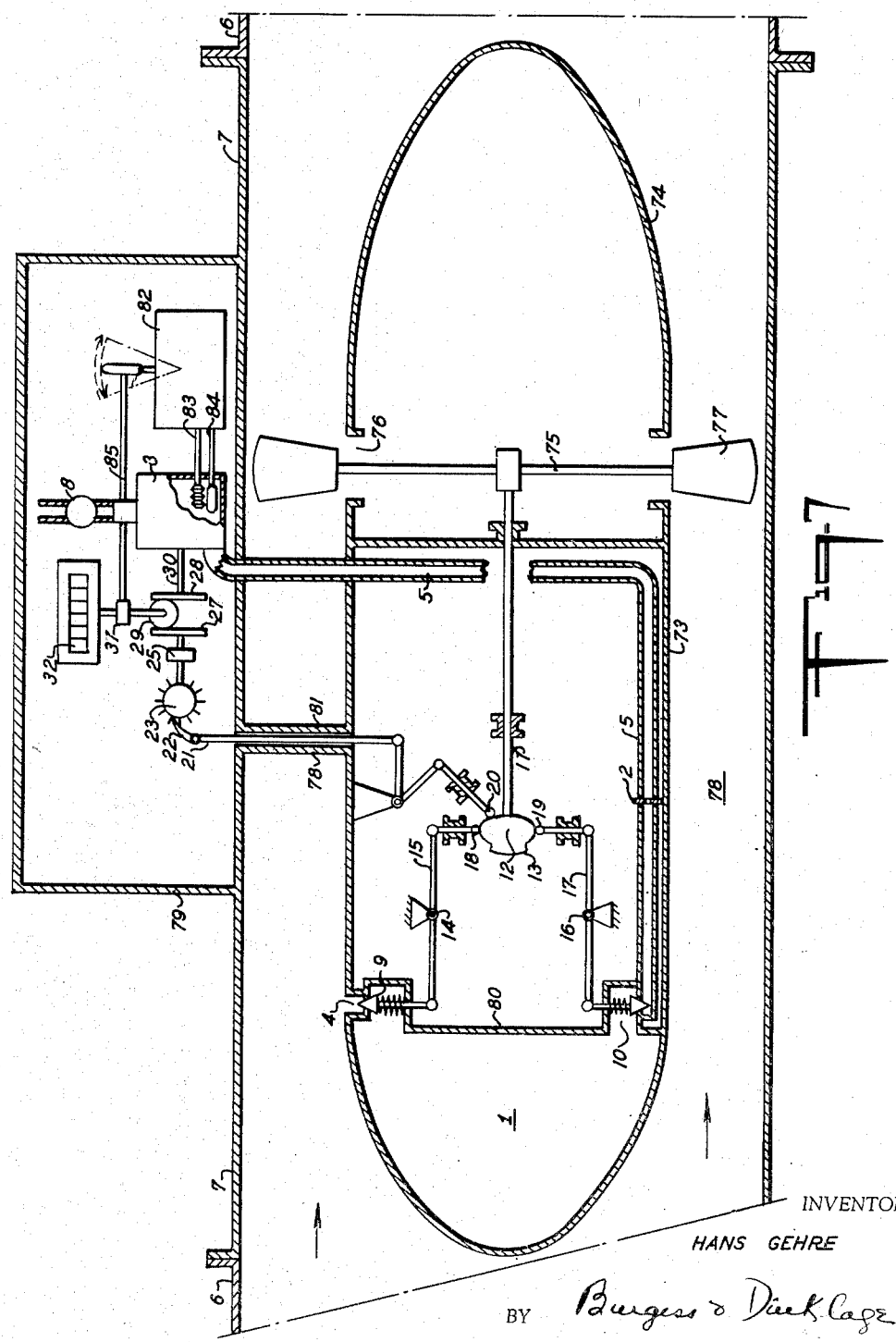
INVENTOR
HANS GEHRE
BY Burgess & Dinkelage
ATTORNEY

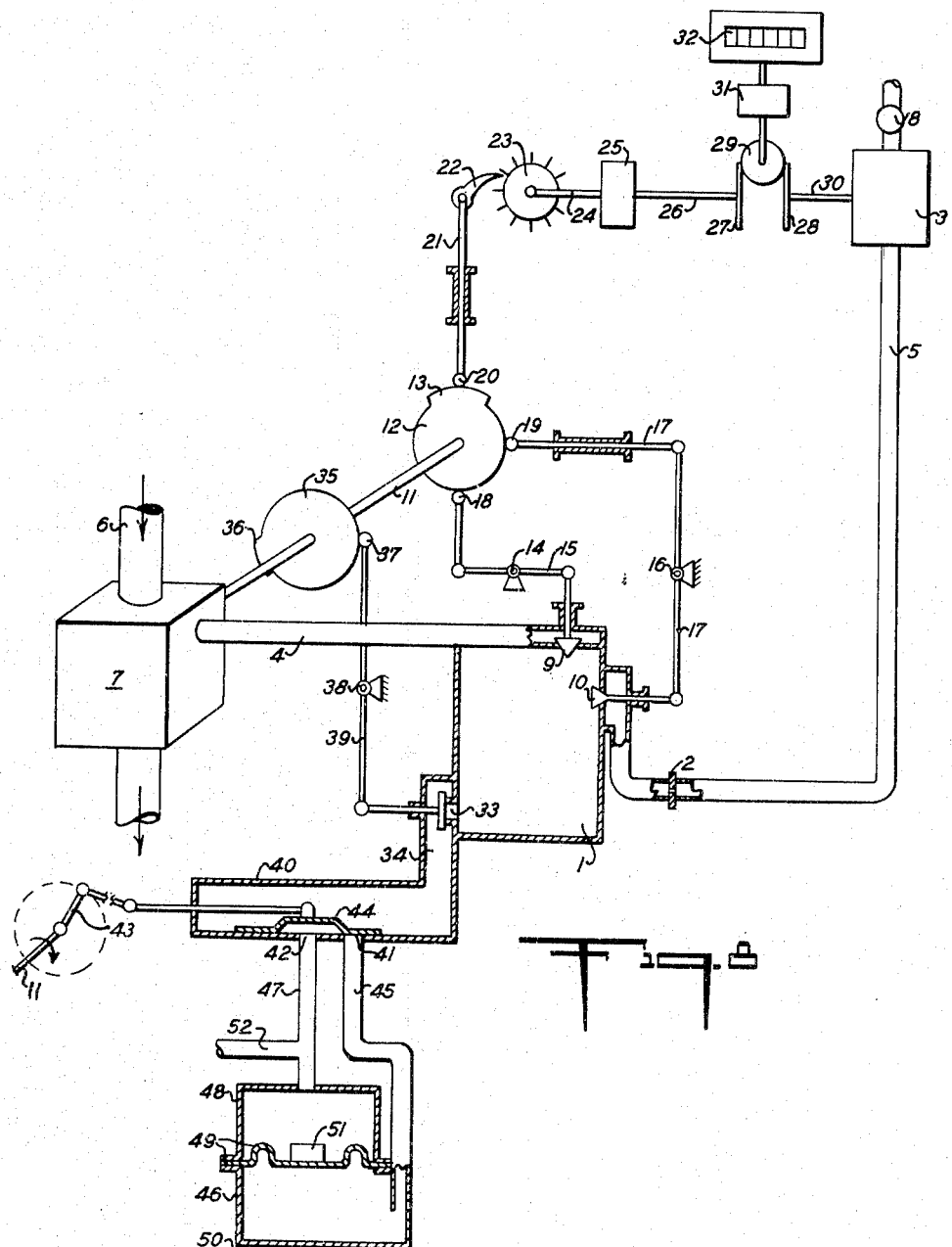

United States Patent Office 2,699,678
Patented Jan. 18, 1955

2,699,678

GAS FLOW MEASURING EQUIPMENT

Hans Gehre, Oberkassel am Rhine, Germany

Application February 24, 1951, Serial No. 212,619

8 Claims. (Cl. 73—203)

The present invention relates to gas flow measuring equipment, it more particularly relates to a device for bleeding off a part-flow of a gas with volume-meters arranged both in the main-flow and in the part-flow, of which the part-flow meter is influenced by the main-flow meter.

Such bleed-off devices are met with in metering-devices for gases flowing in ducts, particularly in the remote indication of measurements and in the volume-correction, wherein the volume-proportionality between the part-flow and the main flow has been till now an indispensable requisition.

In a known device of this kind, in which throttle-openings serve as measuring devices, a regulator is provided, which ensures that the efficacious pressure difference produced by the throttle device of the part-flow at any instant is the same as the efficacious pressure difference produced by the throttle of the main duct. Thus the relationship of the part-flow amount to the main-flow amount (provided that the outflow-coefficients of the throttle openings are considered), is for all pressures equal to the section-ratio of the two throttles.

In another known type of bleed-off device of this kind, the measurement devices are volume-meters, and a regulating valve is arranged in the part-flow which valve is influenced by the main-flow meter in the opening sense and influenced by the part-flow meter in the closing sense, such that the velocity of rotation of the part-flow meter is the same as or is proportional to the velocity of rotation of the main-flow meter.

It is, however, desirable on the one hand to maintain the part-flow in these bleed-off devices as small as possible, particularly where it is led to the free air and so represents a loss. On the other hand, however, these devices are known from experience to be the more unreliable the smaller is the part-flow in proportion to the main-flow.

The sections and the fine-regulation-openings of the needle-valves are the smaller the more sensitive to soiling and clogging by condensation, the regulating-valve has too much inertia in responding to pressure-fluctuations (i. e. pressure-waves, regulator-disturbances and so on) and its closing-pressure is too small to close it completely, so that the shutting off given by the part-flow meter itself (blocking-liquid, membrane) is not sufficient or is overcome.

Such break downs are unacceptable and must be eliminated if volume-reductions are to be made or measurement-results are to be transmitted by means of a partial-flow, in which cases it is indispensable to maintain the prescribed tolerance limits.

It has already been proposed to employ in place of the part-flow meter a chamber of variable volume, the charge and discharge of which chamber is controlled from the main-flow meter. With this arrangement, however, the required volume-proportionality between the partial-flow and the main-flow is not attainable due to the smallness of the gas-volumes bleeded off. For the hourly measure of the bleed-off must not only be proportional to the hourly throughput of the main-flow meter, but it is also necessary that the part-volumes taken from the main-flow be the same at different working pressures and have the working state $p_1$, $T_1$.

By the present invention a bleed-off device is now produced of the type first mentioned, which is distinguished by a high degree of non-sensitivity to dirt and clogging by condensation, and which moreover permits to realise all the requirements for satisfactory measuring and that without volume-proportionality of the bleed-off part-flow.

The invention essentially consists in that in a bleed-off device with meters disposed both in the main-flow and in the part-flow, of which the part-flow meter is influenced by the main-flow meter, a constant-volume bleed-chamber operated by the main-flow meter precedes the part-flow meter, the emptyings of this chamber being added over a gear having a ratio dependent on the volume of the chamber and a summator-device to the registration of the part-flow meter.

The invention and further objects thereof will become more apparent from the following description read in conjunction with the drawing, in which:

Fig. 1 diagrammatically shows a constant volume chamber,

Fig. 2 diagrammatically shows an embodiment of the invention,

Fig. 3 diagrammatically shows a part flow chamber equipped with a scavenging or rinsing device, according to the invention, Fig. 4 shows diagrammatically a scavenging lock according to an embodiment of the invention, Fig. 5 shows still another embodiment of a scavenging flow lock according to the invention, Fig. 6 shows an embodiment wherein the bleed-off device is used for remote indication by means of a part flow, and Fig. 7 is a complete embodiment of the invention with the temperature and pressure responsive means of the volume corrector suitably positioned as to conditions $p_2$, $T_2$.

Fig. 8 is a diagrammatic view embodying in one apparatus the features shown in Figs. 2, 3 and 4.

Figure 1 shows a chamber 1 of constant volume $V_1$, in which a gas at pressure $p_1$ is located which empties by a throttle 2 beyond which the pressure is $p_2$ so that the gas expands at this pressure to the corresponding volume $V_2$. In this event the meter 3 beyond the throttle 2 will show a volume $\Delta = V_2 - V_1$, since the partial volume $V_1$ relaxed to the pressure $p_2$ remains in the chamber.

The mass $G_2$ of this remaining partial volume at the state $p_2$, $T_2$ is $$G_2 = \frac{p_2 \cdot V_1}{R \cdot T_2}$$

If the chamber 1 is now further supplied with gas at the state $p_1$, $T_1$, after the chamber has been completely filled, the contents of the chamber shows an increase of mass, which is given by:

$$G_1 - G_2 = \frac{p_1 \cdot V_1}{R \cdot T_1} - \frac{p_2 \cdot V_1}{R \cdot T_2}$$

where $R$ is the gas-constant for the particular gas. This increase of mass, however, is equal to the mass $$G_3 = \frac{p_2 \cdot \Delta}{R \cdot T_2}$$

of the gas led through the meter 3, that is $G_3 = G_1 - G_2$. In filling the chamber 1 the mass of the incoming gas is $$G_1 - G_2 = G_3 = \frac{p_1 \cdot V_1'}{R \cdot T_1}$$

where $V'_1$ is the actually bleeded off volume, which has no constant size but alters with $p_1$, $T_1$.

This fact plays no part however, if the amount of $V_1$ is added to the volume $\Delta$. Then $$\frac{p_2 \cdot (\Delta + V_1)}{R \cdot T_2} = G_3 + G_2 = G_1 - G_2 + G_2 = \frac{p_1 \cdot V_1}{R \cdot T_1}$$

or:

$$\frac{p_2 \cdot (\Delta + V_1)}{T_2} = \frac{p_1 \cdot V_1}{T_1}$$

In other words, $(\Delta + V_1)$ represents the volume $V_1$ at the working state $p_1$, $T_1$ reduced to the state $p_2$, $T_2$. This is the same however as if in filling the chamber 1 there were no remainder left in it and the whole volume $V_1$ were scooped off in the state $p_1$, $T_1$.

If now (these considerations being transferred to the sphere of practical measurement of gases flowing in ducts), in a part-flow bleed-off with meters arranged both in the main-flow and in the part-flow, such a constant-volume bleed-chamber is arranged to precede the part-flow meter, the charge and discharge of which is controlled by the main-flow meter and if the number $n \cdot V_1$ of the emptying-cycles of the control-device (which number is proportional to the throughput of the main-flow meter), is added over a gear having a ratio dependent on the volume of said chamber and a summator-device to the measurement $n \cdot \Delta$ of the part-flow meter, then the volume $n \cdot (\Delta + V_1)$ read on the counting mechanism according to the above explanations is an exact measure reduced to the state $p_2$, $T_2$ of the gas-consumption indicated by the main-flow meter at the state $p_1$, $T_1$.

Thus by the present invention the attempt to obtain with technical means the bleeding-off of an unobjectionably volume-proportional part-flow, becomes quite unnecessary.

Now the well-known measurement-correction method is based on the equation of state:

$$\frac{p_1 \cdot V_1}{T_1} = \frac{p_0 \cdot V_0}{T_0}$$

As however:

$$\frac{p_1 \cdot V_1}{T_1} = \frac{(\Delta + V_1) \cdot p_2}{T_2}$$

it is sufficient to arrange a variable ratio gear preceding the counting-mechanism of the part-flow meter, which ratio gear is to be governed by a volume corrector, which corrector is exposed to the state $p_2$, $T_2$. Then the counting-mechanism of the part-flow meter will give the reduced volume of the part-flow at the normal state. As however as said the number of the bleed-off cycles is proportional to the throughput-volume read off from the main-flow meter, by a corresponding choice of the gear-ratio, the reduced throughput of the main-flow meter can be read off directly from the counting-mechanism of the part-flow meter.

Consequently the use of the present invention gives at the same time a new two-stage method of measurement-correction free from the above-mentioned sources of error and disturbance, in which first a part-flow of the intermediate state $p_2$, $T_2$ is produced and by the correction of which part flow to the normal state a gear ratio preceding the counting mechanism enables to indicate the main-flow amount directly.

Figure 2 shows an embodiment of the invention in diagrammatic form.

The above-mentioned chamber 1 with constant volume, the throttle-opening 2 and the volume-meter 3 are situated in a part-flow duct 4, 5, which is connected at the entry-side of the main meter 7 to a duct 6 carrying said meter. At the end of the duct 5 a valve 8 is disposed, which is formed as a sort of safety-valve and on which the required pressure $p_2$ can be set.

The chamber 1 comprises an entry-port 9 and an exit-port 10. On both valves heavy springs are provided (not shown) which ensure tight closing of the chamber 1. In the phase shown both valves are in the closed position, valve 9 against the entry-duct 4 and valve 10 against the exit-duct 5.

The control of the two valves is caused by the main-flow meter 7, which operates a cam-disc 12, 13 on a shaft 11. The cam 12 of this disc on the one hand operates the entry-valve 9 by means of the lever 15 pivoted at 14, and on the other hand operates the exit-valve 10 by means of the lever 17 pivoted at 16. The lever 15 carries a roller 18 with which it engages the cam-disc 12 under the action of the closure-spring of the valve 9. The lever 17 has a corresponding roller 19, with which it engages the cam-disc under the action of the closure-spring of the valve 10.

As the cam 13 pushes the roller 18, the entry-valve 9 opens against the action of its closure-spring and gas enters the chamber 1 by the duct 4, in which chamber the exit-valve 10 is at this moment in its closed position. As the cam 13 pushes against the roller 19, the exit-valve 10 opens and the gas can leave the chamber 1, in which the entry-valve 9 is at this moment in its closed position, by the exit-duct 5.

The cam-disc 12, 13 further engages a pawl-mechanism which is connected to it by a roller 20, and at each movement moves the ratchet wheel 23 by the same amount by means of the shaft 21 and the pawl 22.

The rotation of the ratchet-wheel 23 is connected by the shaft 24 to the gear 25 and this rotation is connected by the shaft 26 to the sun-wheel 27 of a differential-gear, the other sun-wheel 28 of which is driven by the shaft 30 of the subsidiary meter 3. The planet-wheel 29 transfers the sum of the movements of the two sun-wheels 27 and 28 over a variable gear 31 to the counting-mechanism 32.

At each rotation of the cam-disc 12, 13 the entry-valve 9 and the exit-valve 10 of the chamber 1, as well as the mechanism of the ratchet-wheel 23, operate once. By opening the entry-valve 9, the chamber 1 is filled with gas entering from the entry-side of the main meter 7 at the working state $p_1$, $T_1$. The valve 9 then closes and the exit-valve 10 opens. The gas now leaves the chamber 1 till a remainder $V_1$ and flows into the duct 5 wherein it expands to the pressure $p_2$ given by the safety-valve 8. The little gas-volume $\Delta$ flowing through the duct 5 is measured by the part-flow meter 3 and passes to the free air by the safety-valve 8.

The rotation of the sun-wheel 28 corresponds to the measured volume $\Delta$ and the gear 25 is so chosen that the motion of the sun-wheel 27 due to each advance of the ratchet wheel 23 corresponds to the volume $V_1$ of the chamber 1 or to the gas-volume left in it at the state $p_2$, $T_2$. Consequently the swinging of the shaft of the planet-wheel 29 is a measure of the sum of the gas-bleedings $n \cdot \Delta$ measured by the part-flow meter 3 on the one hand and the product $n \cdot V_1$ (wherein $n$ is the corresponding quantity of the emptyings of the chamber 1 and $V_1$ is the volume of this chamber) on the other hand. This sum is the amount of the part-flow at the state $p_2$, $T_2$ and is proportional to the flow through the main meter at the state $p_1$, $T_1$.

Partial-flow meter 3, as well as main meter 7, is a conventional type meter for measuring the volume of a gas flowing through a flow line. There is no direct control on partial-flow meter 3 by main meter 7. The only control exerted by main meter 7 upon meter 3 resides in the releasing of valve 10 by meter 7, so that $V_1$ of the bleed chamber may expand to $V_2$, permitting the excess in volume to be measured by meter 3 as $\Delta$ ($\Delta = V_2 - V_1$).

When the bleed-off device according to the invention is used for volume correction in a part-flow, as mentioned, for example, in line 9, column 1 of this specification, the counting-mechanism 32 is driven over a variable gear 31 controlled by an intermediate volume-corrector, which corrector (not shown) is exposed together with the meter 3 to the state $p_2$, $T_2$ of the part-flow. Consequently the counting-mechanism 32 indicates immediately the throughput reduced to the normal state, and according to the gear-ratio chosen either that of the part-flow meter or that of the main-flow meter.

It should be noted that the exit-valve 10 of the chamber 1 can be used as a throttle. In this case the throttle 2 can be omitted. If the actual barometric reading should be used as the intermediate state, the safety-valve 8 can be dispensed with.

As now in filling the chamber 1 with working gas at the state $p_1$, $T_1$ a gas-remainder at the state $p_2$, $T_2$ is left therein, so mixing takes place whereby the mixing-temperature is not the same as the working-temperature in the main flow duct.

To avoid making an error of measurement in this way, in a further improvement of the invention a scavenging-device operated by the main-flow meter is provided on the bleed-chamber of the part-flow, by which at the commencement of the filling-period the gas-remainder is swept out from the chamber by working-gas from the main duct.

In the arrangement shown in Figure 3, the bleed-chamber 1 of the part-flow is equipped with such a scavenging-device. The chamber 1 has a third valve 33 on the opposite side to the valves 9 and 10, which closes a connecting-duct 34 on the exit-side of the main-flow meter 7. The valve 33, called a scavenging-valve hereinafter, is operated by a second cam-disc 35 on the shaft 11 provided with a cam 36 by means of a roller 37 and a lever 39 pivoted at 38.

The mutual position of the two cam-discs 12 and 35 and the sizes of the shoulders of the cams 13 and 36 are so chosen that the scavenging-valve 33 is opened only at a required time after the opening of the entry-valve 9, then remains open for some time and that both valves close simultaneously.

If the main-flow meter is a measuring-wheel meter (Woltman-meter, paddle-wheel-meter), the ducts 4 and 34 can be closed without more ado before and behind the throttle-section of this meter, for in this case the scavenging gas volume is proportional to the throughput of the main-flow meter and can be introduced into the calibration.

If, however, the main-flow meter is a rotary displacement meter for example, then the fall in pressure between the entry and exit sides of the meter even for the smallest gas-throughput is so considerable that the scavenging-gas volume becomes quite disproportionate.

For this case the invention provides the arrangement of a lock operated by the main-flow meter between the bleed-chamber 1 and the exit-duct of the main-flow meter 7, which while separating the remainder or mix-gas swept out of the chamber 1 from this chamber on the one hand, separates it from the exit-duct of the main-flow meter 7 on the other hand, until the scavenging-valve 33 has closed after setting the working-state $p_1$, $T_1$, in the chamber.

An embodiment of such a lock is shown diagrammatically in Figure 4.

In the connection-duct 34 between the bleed-chamber 1 of the part-flow and the exit-side of the main-flow meter is a guide-casing 40 with two openings 41 and 42, which are controlled from the main-flow meter by the shaft 11, a crank-device 43 and a conch-shaped sliding-valve 44 moved by the latter. The opening 41 is connected by a duct 45 with the lower space 46 and the opening 42 by a duct 47 with the upper space 41 of the casing 50 which is divided in two by a membrane 49. The duct 47 is connected to the duct 52, which replaces and continues the duct 34 and is connected with the exit-side of the main-flow meter 7. The membrane 49 is loaded with the weight 51.

If the chamber 1 is filled and the valves 9 and 33 are opened, then the pressure on the entry-side of the lock represents the sum of the pressure on the exit side of the rotary displacement meter 7 and the pressure difference between the both sides of the same and is correspondingly greater than the pressure in the space 48 over the membrane 49 of the lock. If the slider 44 now clears the opening 41, the gas flows from the chamber 1 through the duct 45 to the space 46, and the membrane 49 is raised, whereby the gas displaced by it from the space 48 flows through the duct 52 to the exit side of the rotary displacement meter. The weight 51 is so chosen that the pressure in the lower meter-range is reached with safety to raise the membrane 49.

New working gas at the state $p_1$, $T_1$ now enters the chamber 1 and sweeps out the mixture of working gas and remainder-gas from the chamber. With suitable dimensioning of the membrane 49, this sweeping-out is sufficient to guarantee that the filling of the chamber 1 is made completely with working-gas at the state $p_1$, $T_1$. The slider 44 then connects the openings 41 and 42 together so that the membrane sinks under the action of the loading-weight 51 and displaces the scavenging-gas under it through the ducts 45 and 47 to the duct 52, whereby a similar volume is withdrawn into the space 48 over the membrane 49.

The slider 44 is naturally so operated that it only connects the opening 41 with the chamber 1 if the scavenging-valve 33 is opened.

As the scavenging-flow is proportional by volume to the throughput in the main-flow meter 7, it can be considered without further measurement (see Figure 2), by correspondingly adjusting the indication of the counting-mechanism 32, as, for example, in connection with mandatory official calibrating.

A further embodiment of the scavenging-flow lock is represented diagrammatically in Figure 5 by way of example. It is particularly suitable for cases which necessitate accommodation in the minimum space.

The duct 34 leads into a cylindrical vessel 53 provided with lateral entry and exit means, in which a double piston 55, 56 is held by a spring 54 so as to be freely movable. In one end position this double-piston separates the cylinder 53 by means of the piston-head 56 from the duct 52 leading to the exit side of the main flow meter 7, in which the valve 57 is located. The duct 34 is connected with the upper end of the cylinder 53 by the one-way valve 58 and the duct 59.

The operation of the lock is effected from the main-flow meter by the shaft 11. A cam-disc 60, 61 is furnished on it, which has a pin 62 opposite the cam 61. At each revolution of the shaft 11 this pin engages the lower end of the piston rod 63, which is provided for this purpose with a hook or striker 64, and moves the rod 63 against the action of the spring 54, and releases it by further rotation of the cam-disc 60, 61 in the position shown dotted.

By this occurrence the piston-heads 55 and 56 move downward under extension of the spring 54 and gas is withdrawn into the upper part of the cylinder 53 through the duct 34 and the one-way valve 58, whilst the valve 57 is closed.

Shortly before reaching the lower position, in which the pin 62 frees the rod 63, the cam 61 opens the valve 57 by lifting the roller 65. After the freeing of the rod, the piston heads 55, 56 are drawn up by the spring 54, but their movement is cushioned, since the piston-head 55 compresses the gas above it, and this gas can only escape slowly by reason of controlled leakage between the piston-head and the cylinder-wall.

Scavenging gas now flows from the duct 34 through the cylinder 53 into the duct 52, until the piston-head 56 again closes the duct 52 and the way to the exit-side of the main-flow meter 7. The valve 57 then closes again and the process occurs once more. The upward movement of the pistons is limited by a stop 66, which determines the starting position as shown in the figure.

From the opening of the valve 57 until the closing of the duct 52 by the piston-head 56 takes approximately the same time whether the rotary displacement meter runs quickly or slowly. In this case the error caused by the scavenging-flow cannot be completely considered by the calibration but due to the usual smallness of the part flows the error is of the order of 1 part per thousand of the main-flow, and can be neglected without further consideration.

The present invention is not limited to the examples illustrated and described but can be applied and varied in many ways. Thus, for example, the part-flow ducts 4, 5 with the bleed-chamber 1 and the scavenging-flow device can very advantageously be wholly or partly located in the gas to be measured. Thereby the temperature difference across the throttle 2, which is several degrees centigrade, is compensated for and at the same time heat-exchange between the part-flow and the surrounding air is prevented.

In this arrangement can naturally be included the part-flow meter 3 and the volume-corrector cooperating therewith. Advantageous embodiments of this kind are given particularly in Woltman and paddle-wheel meters, if the part-flow duct, is enclosed in the flow-guide body of the meter with the bleed-chamber, throttles, part-flow meter and corrector.

Should the bleed-off device according to the invention be used for remote indication by means of a part-flow, then the direct mechanical drive of the main meter may be omitted, and the operation of the pawl 22 may be effected by an impulse registering device of any known type, as, for example, a membrane, piston, clapper or float-apparatus or the like, located in the part-flow meter duct 5, and which does not record the quantity of the part-flow, but, as mentioned, only the number of throughput-impulses.

Fig. 6 illustrates the arrangement wherein a bleed-off device is used for remote indication by means of a part flow. As the bleed chamber 1 is emptied, gas passes through the part-flow meter duct 5 and causes membrane 70 to be actuated. The impulse is carried along shaft 71 into and through the lever device represented by 67, 68, and 69, and causes pawl 22 to be operated. When the membrane 70 is actuated by the gas flowing in duct 5, valve 72 is placed in an open position. Thereupon the gas flows out through duct 5 and membrane 70 returns to its original position and valve 72 returns to its closed position. The return of the membrane and valve is effected by a weight or a spring or some such means.

Fig. 7 shows a complete composite form of a device in accordance with the invention installed in a gas line. The main flow meter 7, an axial paddle wheel meter of the Woltman type, is positioned in duct 6. The flow guide body 73, 74 is situated in the interior of the meter, and within this body the measuring wheel shaft 11 is positioned. The measuring wheel 75 is positioned within a slit 76 between the two parts 73 and 74 of the flow guide body. The measuring wheel 75 protrudes with its scoops 77 into the annular channel 78 which surrounds the flow guide body.

In the forward portion 73 of the flow guide body, the bleed-off device in accordance with the invention (see Fig. 2, particularly the lower portion) is installed. The counting mechanism and the volume meter 3 (see Fig. 2, particularly the upper portion) are positioned in the counting mechanism casing 79. Chamber 1 with valves 9 and 10 is positioned in the head of the flow guide body 73, separated from the remainder thereof by the wall 80. Shaft 21 passes through the annular channel 78, being sealed by member 81. The exit duct 5 of valve 10 also passes through the annular channel 78.

In the counting mechanism casing 79, a volume corrector 82 of any desired construction is installed. The variable gear 31 leading to the counting mechanism 32 is controlled and dependent upon the state $p_2$, $T_2$ of the part-flow as designated by pressure and temperature responsive means 83 and 84. The transmission of the correction is effected to the variable gear 31 by member 85. The formation and construction of the volume correcting device is not the subject matter of the present invention. For a description of various types of volume correctors, reference is made to the following publications: United States Patents Nos. 2,240,357; 2,348,593; 2,222,551; 2,206,618; 2,059,547; 1,911,853; 1,881,572; 1,621,203; 1,278,077; and also British Patents Nos. 379,476 and 698,682.

I claim:

1. Gas measuring device for measuring the volume of gas flowing through a main flow line, which comprises a main flow metering device positioned in the main gas flow line, means defining a constant volume bleed chamber connected to said main flow line by means of a partial flow line, first valve means positioned for restricting gas flow from said partial flow line to said bleed chamber, said bleed chamber defining a gas exit therefrom, a partial flow metering device positioned for measuring the volume of gas passing through said gas exit, second valve means positioned for restricting the flow of gas from said exit, first valve control means actuated by said main flow metering device and positioned for actuating said first valve means, second valve actuating means actuated by said main flow metering device and positioned for actuating said second valve means, said first valve actuating means and said second valve actuating means being positioned so that said first valve means receives opening actuation by said main-flow metering device, and then closing actuation by said main-flow metering device, and thereafter said second valve means receives opening actuation by said main-flow metering device and then closing actuation by said main-flow metering device, transmission means for receiving two actuation impulses and transmitting the sum thereof, means connecting said transmission means with said main-flow metering device to feed one impulse to said transmission means proportionate to the volume of said constant volume bleed chamber, means connecting said transmission means with said partial-flow metering device to feed another impulse to said transmission means, and indicator means connected with said transmission means for receiving the sum of the impulses.

2. Measuring device according to claim 1, in which said bleed chamber has a scavenging valve positioned therein and including means connected to said main-flow metering device for opening actuation of said scavenging valve substantially simultaneously with the opening actuation of said first valve means.

3. Measuring device according to claim 2, including a scavenging flow duct positioned for receiving gas flowing through said scavenging valve means, and connected to the exit side of said main flow metering device, sealing means movably positioned in said scavenging flow duct for movement between a sealing position and an open position by said main flow metering device.

4. Measuring device according to claim 3, in which said scavenging stream sealing means includes means defining an enclosed chamber with a diaphragm positioned in the center thereof and dividing said chamber into two parts, means defining a first inlet positioned for admitting gas from said scavenging flow duct to one side of said diaphragm, means defining a second inlet positioned for admitting gas to the other side of said diaphragm, said second inlet being connected to the exit side of said main flow metering device, a slide valve movably positioned between a first position opening said first inlet means and closing said second inlet means from said scavenging flow duct, and a second position closing both inlets from said scavenging flow duct and interconnecting them for gas flow, means connected to said main flow metering device for moving said slide valve to said first position substantially simultaneously with the opening actuation of said scavenging valve and means connected to said main flow measuring device for moving said slide valve to said second position substantially simultaneously with the closing actuation of said scavenging valve.

5. Measuring device according to claim 1, including scavenging valve means positioned in said bleed chamber, a scavenging flow duct connected from said scavenging valve means to the exit side of said main flow metering device, means defining a cylindrical container positioned in said scavenging flow duct, a double piston slide positioned in said cylindrical container, means connecting said double-piston slide to said main flow metering device for actuation in one direction substantially simultaneously with the opening actuation of said scavenging valve, spring means positioned for urging said double piston slide in the opposite direction, whereby scavenging duct gas flows through said scavenging flow duct to the exit side of said main flow metering device upon actuation of said double piston by said main flow metering device.

6. Measuring device according to claim 1, in which said main flow metering device is a Woltman type meter including an axial flow turbine wheel.

7. Metering measuring device according to claim 1 including safety valve means positioned at the exit side of said partial flow metering device for allowing gas release at a predetermined excess pressure.

8. Measuring device according to claim 1 in which at least a portion of said partial flow line is positioned within said main flow line.

References Cited in the file of this patent

UNITED STATES PATENTS

| Number | Name | Date |
|---|---|---|
| 1,759,384 | Wilkin et al. | May 20, 1930 |
| 2,085,224 | Krueger | June 29, 1937 |
| 2,229,195 | Smith | Jan. 21, 1941 |

FOREIGN PATENTS

| Number | Country | Date |
|---|---|---|
| 278,992 | Italy | Oct. 27, 1930 |
| 384,383 | Great Britain | Dec. 8, 1932 |
| 704,621 | Germany | Apr. 3, 1941 |